Jan. 1, 1963    P. SCHLUMBOHM    3,071,312
CENTRIFUGAL PUMP
Filed Dec. 15, 1958

INVENTOR.

3,071,312
Patented Jan. 1, 1963

3,071,312
CENTRIFUGAL PUMP
Peter Schlumbohm, 41 Murray St., New York 7, N.Y.
Filed Dec. 15, 1958, Ser. No. 780,561
5 Claims. (Cl. 230—118)

The present invention is a continuation in part of my co-pending patent application, Ser. #354,786, now Patent #2,877,865, which itself is a continuation-in-part of my Patent #2,706,016. In the parent application a method has been claimed for pumping gases centrifugally from a space of starting pressure to a space of higher pressure by letting the fluid flow through an entry zone into a centrifuging space and by maintaining throughout the centrifuging space a pressure smaller than the starting pressure, by the cooperating measures of (*a*) restricting the flow of the entering fluid to a one-way, axial porous flow, and (*b*) restricting the flow of the ejected gas in the ejection zone to a one-way, valved flow.

One modification for executing the method is claimed in my U.S. Patent #2,706,016. In that case a plurality of porous discs walls a space between them which is the centrifuging space.

A second modification is claimed in the co-pending patent application #354,786, now Patent #2,877,865, in which a rotating single disc of porous material and an impervious stationary wall form the walls of the centrifuging space.

The present invention refers to a third modification of apparatus for the method cited above.

A fourth modification is claimed in my copending application Ser. #780,562, filed on the same day as the present application.

Figure 1:
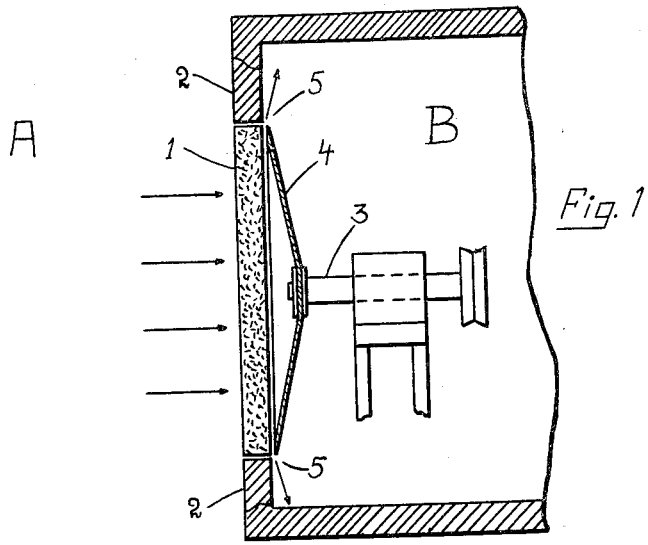
Figure 2:
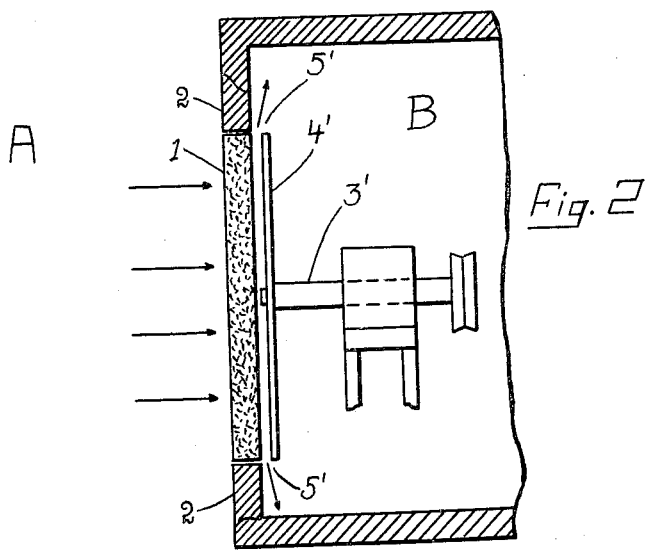

The invention is illustrated in FIG. 1 and FIG. 2.

In this third modification, the porous disc which forms one wall of the centrifuging space is stationary and the opposite wall of the centrifuging space is formed by a rotating impervious disc.

FIG. 1 is a side view, partly in view and partly in vertical section. It shows the porous disc 1 mounted stationarily for instance as a window in a wall 2. In proximity, coaxially mounted on a rotatable shaft 3, is an impervious disc 4. In the modification of FIG. 1, this disc 4 is of flexible material such as plastic foil, waxpaper, aluminum foil, or other sheet material of impervious quality and flexibility. FIG. 1 illustrates how, in operation, the disc 4 will be deformed to the shape of a frustum of a cone, due to the partial vacuum, so as to form a restricted peripheral outlet 5. The space underneath the disc comprises a center zone around the axis of rotation and a peripheral ejection zone. The entering fluid flows axially through the pores of the disc 1 in what may be termed a one-way, axial porous flow, and then flows outwardly through the restricted peripheral ejection zone in what may be termed a one-way valved flow. The flow of the fluid is indicated by arrows.

The modification shown in FIG. 2 differs from the modification shown in FIG. 1 by the use of a stiff impervious rotating disc 4'. While the flexible disc 4 shown in the modification of FIG. 1 will adjust the ejection slot 5 automatically, riding on the load, the restriction of the ejection slot 5' in FIG. 2 must be adjusted by choosing the right proximity between the porous disc 1 and the rotating stiff disc 4'. This can be done by moving the rotating shaft 3' towards or away from the porous disc 1. The material for the porous disc 1 is preferably of ceramic nature, including silicates.

The modification of FIG. 1 has technical advantages over the modification shown in FIG. 2 as long as no high temperatures of the pumped fluid are involved. For the applications of high temperatures of the pumped fluids, foil would not stand up well and in that case the stiff disc for the modification shown in FIG. 2 is preferable as the material of the disc can be chosen to withstand the high temperatures in question.

Altogether this present invention offers the possibility of directing the pumped fluid from the centrifuging space into a space of higher pressure and to prevent, due to the use of the impervious disc, the return of the fluid from this latter space through the walls of the centrifuging space.

Having now described the nature of my invention and shown examples of the manner in which it may be performed,

I claim as my invention:

1. Friction pump for pumping gases centrifugally, comprising a stationary plane wall of porous material of predetermined flow resistance, said wall forming part of the wall of the centrifuging space; and further comprising an axially rotatable disc of impervious flexible material arranged parallel to, and in close proximity to said porous wall and forming the remainder of the walls of the centrifuging space; said disc forming in its peripheral zone, together with said stationary wall, an ejection slot for the centrifuged fluid, and said proximity being such that on rotation said slot is just wide enough for a one-way flow of the ejected gas.

2. Centrifugal pump for centrifuging fluids from its centrifuging space to a peripheral ejection zone, characterized by a centrifuging space walled by two discs of equal diameter, mounted coaxially close to each other as pumping and co-pumping wall and leaving between them a peripheral 360° ejection slot, one wall being porous and forming with its pores the intake for the fluid entering the centrifuging space and being stationary, and the other wall being of impervious material and rotatably mounted on a shaft which is coaxial with the centrifuging space.

3. Centrifugal pump as claimed in claim 2, in which said impervious disc is made from flexible, impervious, flat sheet material.

4. Friction pump for pumping gases centrifugally from a space of starting pressure to a zone of higher pressure by letting the gas flow through an entry zone into a centrifuging space walled with two disc-shaped walls of equal diameter, and having a center zone and a peripheral ejection zone, in which a pressure smaller than the starting pressure is created by centrifuging the gas towards the peripheral ejection zone, comprising a stationary, plane porous wall forming one of the two walls of the centrifuging space, a rotatable shaft arranged in front of this wall at an angle of 90°, a single disc of impervious material, having an inner and an outer surface, forming the second one of the two walls of the centrifuging space, facing with its inner surface of porous stationary wall, whereby the pores of said stationary wall form the only passage for the gas entering the centrifuging space.

5. In a centrifugal pump comprising an annular casing terminating in an end-wall having a circular aperture therein, a porous disc fixed to the wall of said aperture and completely covering the same, an impeller having a shaft and fixed to rotate coaxially with said central aperture in said casing, said impeller comprising a flat disc of flexible, impervious material, said disc on rotation thereof assuming a conical configuration while having a close running clearance with the wall about said central aperture and becoming co-extensive therewith overlapping the same in a radial sense, whereby fluid is sucked in axially on the entire surface of said porous disc and ejected peripherally at the edge of the disc, and said disc upon stopping of rotation being forced by the back pressure into engagement with the disc, substantially cutting off the reverse flow through said porous disc.

References Cited in the file of this patent

UNITED STATES PATENTS

| | | |
|---|---|---|
| 1,810,083 | Norinder | June 16, 1931 |
| 2,087,834 | Brown et al. | July 20, 1937 |
| 2,325,221 | Bretzloff et al. | July 27, 1943 |
| 2,392,124 | Denys | Jan. 1, 1946 |
| 2,632,598 | Wales | Mar. 24, 1953 |
| 2,655,310 | Schlumbohm | Oct. 13, 1953 |
| 2,739,757 | Schlumbohm | Mar. 27, 1956 |
| 2,877,865 | Schlumbohm | Mar. 17, 1959 |
| 2,910,223 | Schlumbohm | Oct. 27, 1959 |
| 2,967,051 | Mobley | Jan. 31, 1961 |

FOREIGN PATENTS

| | | |
|---|---|---|
| 130,157 | Great Britain | July 25, 1919 |
| 162,142 | Austria | Apr. 15, 1948 |
| 439,542 | France | Apr. 12, 1912 |
| 619,722 | Great Britain | Mar. 14, 1949 |
| 751,591 | Great Britain | June 27, 1956 |
| 1,116,535 | France | Feb. 6, 1956 |